(12) United States Patent
Hunter

(10) Patent No.: US 7,743,696 B2
(45) Date of Patent: Jun. 29, 2010

(54) ROOT AND WATER MANAGEMENT SYSTEM FOR POTTED PLANTS

(75) Inventor: Malcolm Nigel Hunter, Brisbane (AU)

(73) Assignee: Anova Solutions Pty. Ltd., Chapel Hill, Queensland (AU)

( * ) Notice: Subject to any disclaimer, the term of this patent is extended or adjusted under 35 U.S.C. 154(b) by 801 days.

(21) Appl. No.: 10/583,288

(22) PCT Filed: Dec. 17, 2004

(86) PCT No.: PCT/AU2004/001774

§ 371 (c)(1),
(2), (4) Date: Jun. 16, 2006

(87) PCT Pub. No.: WO2005/058016

PCT Pub. Date: Jun. 30, 2005

(65) Prior Publication Data

US 2007/0094928 A1    May 3, 2007

(30) Foreign Application Priority Data

Dec. 17, 2003 (AU) .............................. 2003906964
May 19, 2004 (AU) .............................. 2004902653
Aug. 20, 2004 (AU) .............................. 2004904734

(51) Int. Cl.
*A47J 31/00* (2006.01)
*E02B 13/00* (2006.01)

(52) U.S. Cl. .......................................... 99/323; 405/38
(58) Field of Classification Search ........ 99/279–323.3; 405/38–52; 47/59 R–63
See application file for complete search history.

(56) References Cited

U.S. PATENT DOCUMENTS 3,830,015 A    8/1974    Belgiorno
(Continued)

FOREIGN PATENT DOCUMENTS

FR    2 701 808 A1    9/1994
(Continued)

OTHER PUBLICATIONS

Notification of Transmittal of International Preliminary Report on Patentability, PCT/AU2004/001774, Dec. 17, 2004.
International Search Report, PCT/AU2004/0001774, Dec. 17, 2004.

*Primary Examiner*—Daniel Robinson
(74) *Attorney, Agent, or Firm*—Thomas A. Runk; Fulwider Patton LLP

(57) ABSTRACT

A pot (40) shown having a well formed by a side wall connecting a base wall aperture (43) and internal aperture (44). A mesh (42) is provided to retain liquid transferring material. The invention provides a liquid transfer means for transferring liquid between growth medium and a local environment external to the pot and adjacent the base wall, the liquid transfer means transferring liquid to in or from an internal zone in the chamber wherein the internal zone is spaced from the bottom wall. Alternative embodiments provide a solid liquid permeable plug (20) which may be inserted in a tight nesting fitting through a bottom wall aperture (21) or through a well (36). Alternatively, a wick arrangement (56) may be provided to insert through a well or a side wall aperture (65) and extending into the internal zones. The conduit may be formed as a slot (52). A cap (54) may be optionally be provided. The invention extends to a method of water control and a system for controlling a plurality of pots according to the disclosure. The pots may be located on a capillary mat (68) and in liquid communication therewith to transfer a liquid to and/or from the internal zone in the base of the pot. The pot base is preferably planar externally to provide an easy working surface.

11 Claims, 9 Drawing Sheets

U.S. PATENT DOCUMENTS

| | | | |
|---|---|---|---|
| 3,958,366 A | 5/1976 | Meyers | |
| 4,027,429 A | 6/1977 | Georgi | |
| 4,062,147 A | 12/1977 | Phillips | |
| 4,077,159 A | 3/1978 | Haglund | |
| 4,138,803 A | 2/1979 | Sherlock | |
| 4,219,967 A * | 9/1980 | Hickerson | 47/72 |
| 4,287,682 A | 9/1981 | Browne | |
| 4,324,070 A | 4/1982 | Swisher | |
| 4,329,814 A | 5/1982 | Blicha | |
| 4,347,687 A | 9/1982 | Sibbel | |
| 4,571,883 A | 2/1986 | Shaw | |
| 4,685,827 A | 8/1987 | Sibell | |
| 4,908,986 A | 3/1990 | Rowland et al. | |
| 5,010,687 A | 4/1991 | Hougard | |
| 5,067,275 A * | 11/1991 | Constance | 47/62 E |
| 5,187,894 A * | 2/1993 | Ripley et al. | 48/86 |
| 5,311,700 A | 5/1994 | Thomas | |
| RE35,006 E * | 8/1995 | Ripley et al. | 47/65.9 |
| 5,938,372 A | 8/1999 | Lichfield | |
| 5,956,899 A | 9/1999 | DiOrio | |
| 5,983,565 A | 11/1999 | Chu | |
| 6,178,691 B1 | 1/2001 | Caron et al. | |
| 6,339,899 B1 | 1/2002 | Lehmann | |
| 6,729,070 B1 | 5/2004 | Locke et al. | |
| 6,766,817 B2 | 7/2004 | da Silva | |
| 6,918,404 B2 | 7/2005 | Dias da Silva | |
| 7,066,586 B2 | 6/2006 | da Silva | |
| 2002/0046492 A1 | 4/2002 | Haas | |
| 2004/0144026 A1 | 7/2004 | Fan | |

FOREIGN PATENT DOCUMENTS

| | | |
|---|---|---|
| FR | 2 704 808 A1 | 9/1994 |
| FR | 2 766 327 A1 | 1/1999 |
| GB | 2 018 117 A | 10/1979 |
| JP | 8196157 A | 2/1992 |
| JP | 8196157 A | 8/1996 |
| JP | 11113408 A | 4/1999 |
| JP | 2001-161195 | 6/2001 |
| NL | 9001748 | 9/1989 |
| NL | 9001748 A | 9/1989 |
| WO | WO 86/05355 A1 | 9/1986 |
| WO | WO 94/19928 A1 | 9/1994 |
| WO | WO 95/10934 A1 | 4/1995 |
| WO | WO 2005005816 A1 | 6/2005 |

* cited by examiner

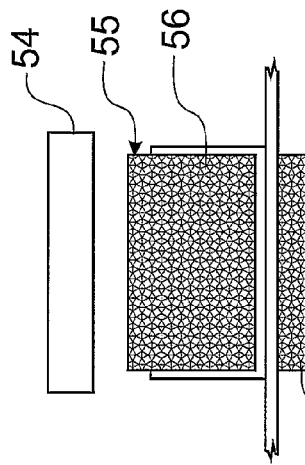
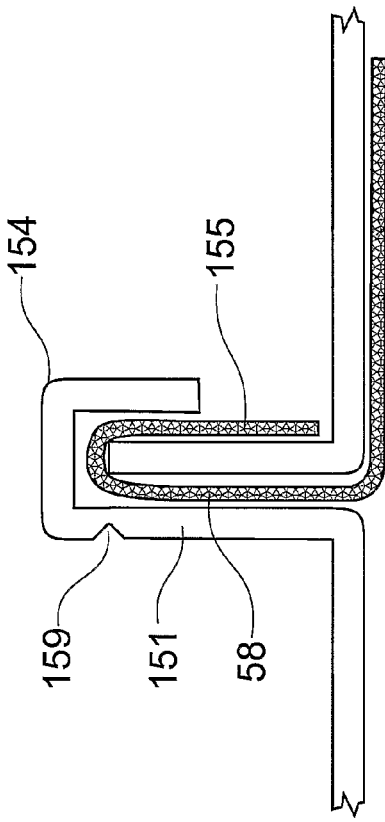
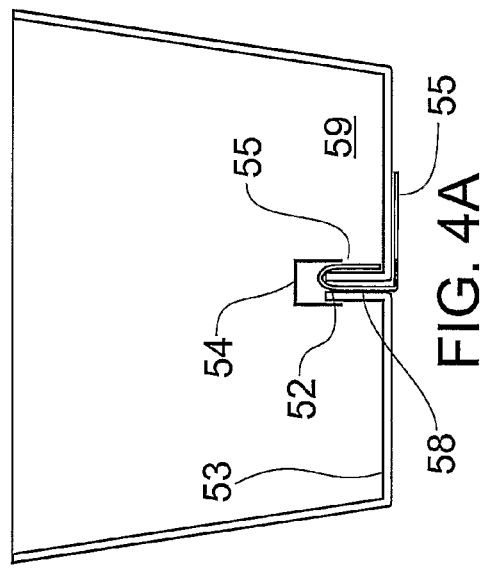
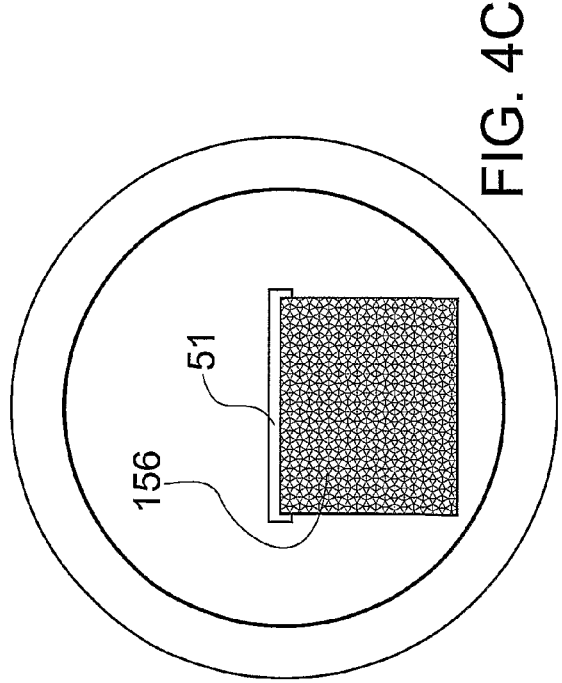

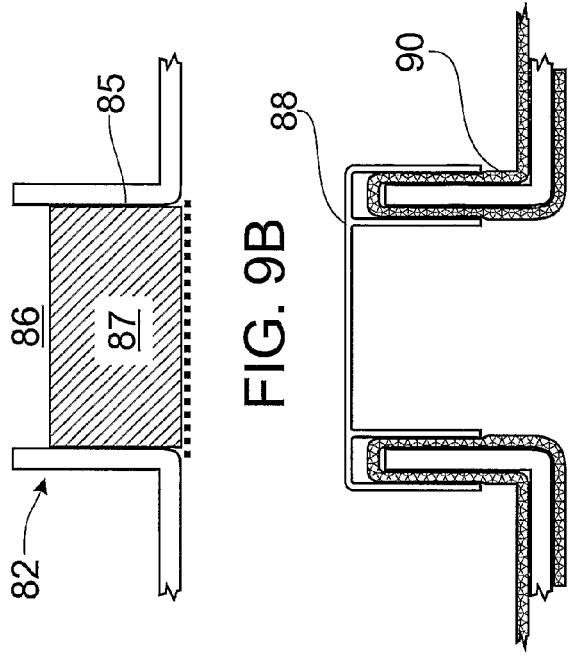
FIG. 9A
FIG. 9B
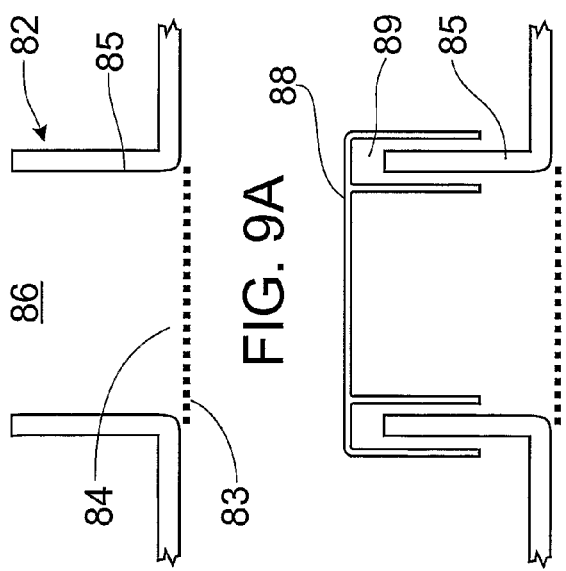
FIG. 9C
FIG. 9D
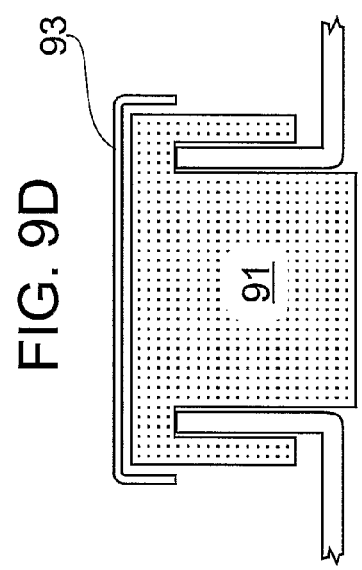
FIG. 9E
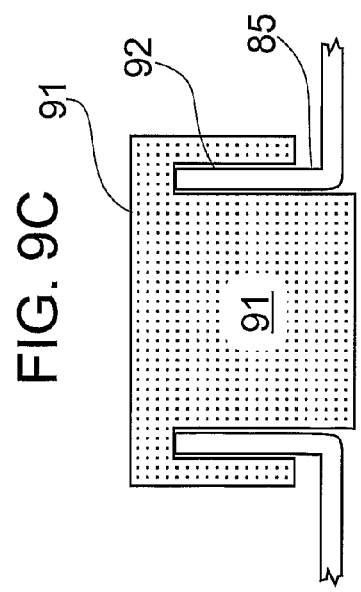
FIG. 9F

ROOT AND WATER MANAGEMENT SYSTEM FOR POTTED PLANTS

RELATED APPLICATIONS

This is a U.S. national phase of PCT/AU2004/001774 which claims priority to Australia patent provisional application no. AU2003/906964, filed Dec. 17, 2003 and Australia patent provisional application no. AU2004/902653, filed May 19, 2004 and Australia provisional patent application no. AU2004/904734, filed Aug. 20, 2004

FIELD OF THE INVENTION

THIS INVENTION relates to a novel pot for use with plants and an arrangement and method for delivering a liquid, particularly water, to a plant-growing medium and for removing excess liquid from the medium. The device and method are particularly well suited to use in a commercial and/or nursery setting but are not so restricted and may be useful for individual plants in a domestic context.

BACKGROUND OF THE INVENTION

Most container grown plants, particularly production grown pot plants, are watered from above by an arrangement which may include one or more of sprinklers, drippers, and a handheld hose. Increased costs of providing water and also attempts to better stabilise the water content of pots has led to growing interest in the use of bottom watering systems. Bottom watering has been widely practiced in the production of bedding plants, but its wider adoption will be highly likely to occur with other species as water costs escalate, water use is restricted and point source pollution is penalised.

It has been a long held ambition of plant propagators to maximise the effect of watering to thereby improve pot plant culture, not only to reduce water stress but also in terms of automation leading to lower labour requirements and increased efficiency.

The traditional pot plant is formed from a durable polymer or clay material and has a central drainage hole or a plurality of basal holes and/or holes arranged peripherally around a lower wall or base or centrally in the base. One major problem that arises with the use of such pots relates to water uptake and drainage of excess water through the holes, both of which processes are likely to become impeded by root growth. Roots may physically obstruct the passageway provided by the hole or holes. Roots may also concentrate within but at the base of the pot below the potting medium forcing the medium up and out of direct contact with a capillary watering bed in a commercial bottom watering system. This is highly likely to reduce upwards capillary flow rate since the capillary flow rate through a root mass will be compromised relative to the flow through the growth medium.

Escaped roots may also mat beneath a pot causing attenuation of the contact between the water delivery mat and plant-growing medium, thereby further compromising capillary supply of water to the plant.

A commonly promoted theory is that roots seek out a source of water and grow into the source of water to such an extent as to eventually plug the water conduit (see, for example, U.S. Pat. No. 5,938,372 to Lichfield). The teaching therefore is that roots will grow preferentially in the direction of incoming water and are positively hydrotropic.

It would be of advantage to provide a pot that limited root escape and also provided a pathway for liquid to move out of and preferably into the pot.

SUMMARY OF THE INVENTION

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

In a first aspect, but not necessarily the only or the broadest aspect the invention may reside in a pot for growing a plant or plants, the pot comprising a side wall having an upper edge forming a mouth;

a bottom wall continuous with the side wall, the bottom wall and side wall together defining a chamber for containing a growth medium; and liquid transfer means for transferring liquid between the growth medium and a local environment external to the pot and adjacent the base wall, wherein the liquid transfer means transfers liquid to and/or from an internal zone in the chamber, the internal zone spaced from the bottom wall. The present pot is adapted to resist root escape.

The liquid transfer means may comprise one or more liquid transfer conduits and each liquid transfer conduit may extend upwardly from a base aperture in the bottom wall to an internal aperture positioned in the internal zone.

The liquid transfer conduit may be formed with a water impervious side wall and may be cylindrical.

The pot may include retention means for retaining liquid transferring material in the liquid transfer conduit.

The liquid transferring material may be one or more of a growth medium, coir dust, bark and polyester.

Alternatively the liquid transferring material may be a solid, liquid-permeable plug.

The plug may be an expanded plug having an inner end extending laterally beyond the side wall of the liquid transfer conduit.

The retention means may be a mesh positioned in the base aperture. The mesh may be removably positioned in the base aperture or may be formed integrally with the liquid transfer conduit.

Each liquid transfer conduit is preferably formed integrally with the pot.

The liquid transfer conduit may be formed as an upwardly extending slot and may further include a material wick positioned in the slot.

The pot may further comprise an internal cap adapted to cover the internal aperture, sufficiently loosely to allow liquid to pass between the cap and an edge of the aperture.

The internal cap may be substantially planar or may extend downwardly over an edge of the internal aperture.

The cap may be hingedly connected to the liquid transfer conduit.

The liquid transfer means may comprise one or more liquid permeable plugs each inserted through a corresponding base aperture and closely abutting a wall of the aperture.

Each liquid permeable plug may be formed from one or more of concrete, mortar, clay, rubber, polymeric material, wood and polyester and the plug may be cylindrical.

Each liquid permeable plug may include a butt section which may flare outwardly.

The liquid permeable plug may be waisted to provide a seat for an edge of the base aperture.

The gap between the liquid permeable plug and the base is sufficiently small to resist root exit and may be 500 microns or less. The gap may be 300 microns or less and could be 200 microns or less. Most preferably the gap is in the range of 50 to 100 microns.

Each liquid permeable plug may be removably fitted in its corresponding aperture and may be held in position by wedges. Alternatively, the liquid transfer means may comprise a flexible fibrous water-permeable member inserted through one or more apertures in the side wall and/or the base wall, the fibrous member dimensioned to substantially fill the aperture.

The fibrous member may be a wick which may be positioned through an aperture in the side wall, the aperture spaced upwardly from the bottom wall.

The aperture is preferably positioned 0.5 cm or more above the bottom wall.

The wick may extend under the bottom wall, and insert through a second aperture in the side wall, the second aperture spaced from the bottom wall and from the aperture. Two or more wicks may be inserted through corresponding apertures.

The fibrous member may be formed from one or more of spun bond polyester geotextile, calico, hessian or hemp.

Alternatively the liquid transfer conduit may be formed as a siphon tube having an outlet aperture formed in the bottom wall, an inlet aperture positioned in the chamber, and an intermediate tube between the inlet aperture and outlet aperture, the intermediate tube extending upwardly of the inlet aperture and adapted to create a siphon effect when a liquid level in the pot rises above the siphon tube.

The inlet tube may be configured as an upwardly curved tube and the siphon tube may be embedded in a solid block which may be formed of a polymeric material such as polyethylene.

In a further aspect, the invention may reside in a pot for growing a plant or plants and adapted to provide, in use, transfer of liquid to and/or from an internal zone in the pot, the internal zone spaced from a bottom wall, and a local environment external to the pot and adjacent the base wall, the pot comprising:

a side wall having an upper edge defining a mouth;

a bottom wall continuous with the side wall and together defining the chamber; and one or more conduits extending inwardly from the base wall, each conduit open at both ends and adapted to receive a liquid transferring material. Each conduit may extend from 2 mm to 80 mm.

The liquid transferring material may be one or more of a liquid permeable plug, a material wick, growth medium, soil, coir dust, bark and polyester.

The conduit may be dimensioned to receive the growth medium under the influence of gravity. The conduit may be cylindrical and may have a diameter in the range of 5 mm to 50 mm.

The pot may further comprise retention means for retaining the liquid transferring material in position in the conduit.

The retention means may comprise a mesh and the mesh may be formed integrally with the conduit. Alternatively the mesh may be removably located in a bottom wall aperture of the pot.

The pot may further comprise a cap locatable on a corresponding internal aperture of a conduit, sufficiently loosely fitting to allow liquid to and from the aperture.

The cap may be substantially planar for positioning over the internal aperture or alternatively may extend downwardly over the internal aperture.

In still a further aspect, the invention may reside in a pot for growing one or more plants, the pot adapted to transfer liquid to and/or from an internal zone in a chamber of the pot, the internal zone spaced from a bottom wall of the pot, and a local environment external to the pot adjacent the bottom wall, the pot comprising a side wall having an upper edge defining a mouth;

a bottom wall continuous with the side wall and together defining the chamber and one or more conduits extending inwardly from the bottom wall and adapted to transfer excess liquid out of the pot, each conduit formed substantially as an inwardly extending slot having a continuous side wall.

Each conduit side may have a width in the range of 1 mm-5 mm and a length in the range of 5 mm-60 mm. Each conduit may have a cap.

The cap may be removable from the conduit or alternatively the cap may be hingedly attached to an edge of an internal aperture of the slot.

The cap may extend downwardly of at least one free edge of the internal aperture of the slot thereby forming a tortuous pathway for liquid flow.

The pot may further include a material wick positioned in the slot and also describing a tortuous path.

A material wick may be positioned in each conduit.

In yet a further aspect of the invention may reside in a method of managing water content in a pot for growing one or more plants, the method comprising the step of providing a transfer arrangement for transferring liquid directly to and/or from an internal zone of a growth medium inside the pot, the internal zone spaced from a bottom wall of the pot, and a local environment adjacent the bottom wall, the transferred liquid passing through a bottom wall and/or a side wall of the pot.

The method may further include the step of positioning growth medium in an inwardly extending conduit, the conduit having a first opening through the bottom wall and a second opening inside the internal zone, the growth medium in the conduit acting as a liquid transfer material between the internal zone and local environment.

Transferring liquid may include the step of positioning a material wick in an inwardly extending conduit.

Transferring liquid may include the step of positioning a material wick through at least one aperture in a side wall of the pot, the aperture spaced from the bottom wall.

In a further aspect of the invention may reside in a system for managing liquid levels in a plurality of pots containing plants, the system comprising a capillary mat for transferring the liquid and two or more pots according to claim 1 positioned on the capillary mat and in hydraulic communication with a liquid in the capillary mat.

The capillary mat preferably comprises a lower impermeable layer, an intermediate capillary layer, and an upper impermeable layer, the upper layer having apertures formed and adapted to receive a corresponding pot to thereby provide the hydraulic communication.

The upper layer may be formed by overlaid sections of impermeable material configured to permit liquid flow between the capillary load and an upper surface of the upper layer.

The system may further include a sprinkler system for delivering liquid to the pots.

A pot of the present invention may further comprise one or more indicator holes in the side wall, each hole spaced from the bottom wall and adapted to allow liquid to flow outwardly when a water table in the pot reaches the level of the one or more holes.

Two or more holes may be positioned around a perimeter of the pot at substantially the same level.

The pot may further comprise one or more basal side wall apertures in the wall of the pot, the basal apertures adapted to allow exit of roots from the pot.

The pot preferably has a bottom wall that is substantially planar.

The liquid transfer means may be at least one transfer conduit located through and extending upwardly from the one or more apertures. The one or more apertures may be in or near the bottom wall. The liquid transfer conduit is preferably located in close proximity to or abutting contact to an edge of its corresponding aperture. Preferably, close proximity implies a range of 500 microns or less, preferably 300 microns or less and most preferably 200 microns or less. A particularly suitable range is 100 microns or less and preferably 50 to 70 microns. The liquid transfer means may comprise a plurality of water transfer conduits, each located through a corresponding aperture.

In yet a further aspect, the invention resides in a method of providing liquid to a growth medium for a plant, the method comprising locating a water conduit member through an aperture in a pot and positioning the water flow conduit such that it is in close or abutting contact with an edge of the aperture so as to resist escape of plant roots.

BRIEF DESCRIPTION OF THE DRAWINGS

In order to provide a better understanding of the present invention, preferred embodiments will be described in detail, by way of example only, with reference to the accompanying drawings in which:

FIG. 9 is a series of sectional schematic views of alternative arrangements in pots of the present invention;

DETAILED DESCRIPTION OF THE DRAWINGS

The following description is given by way of example only and should not be seen as restrictive on the broad scope of the invention.

Figure 1:
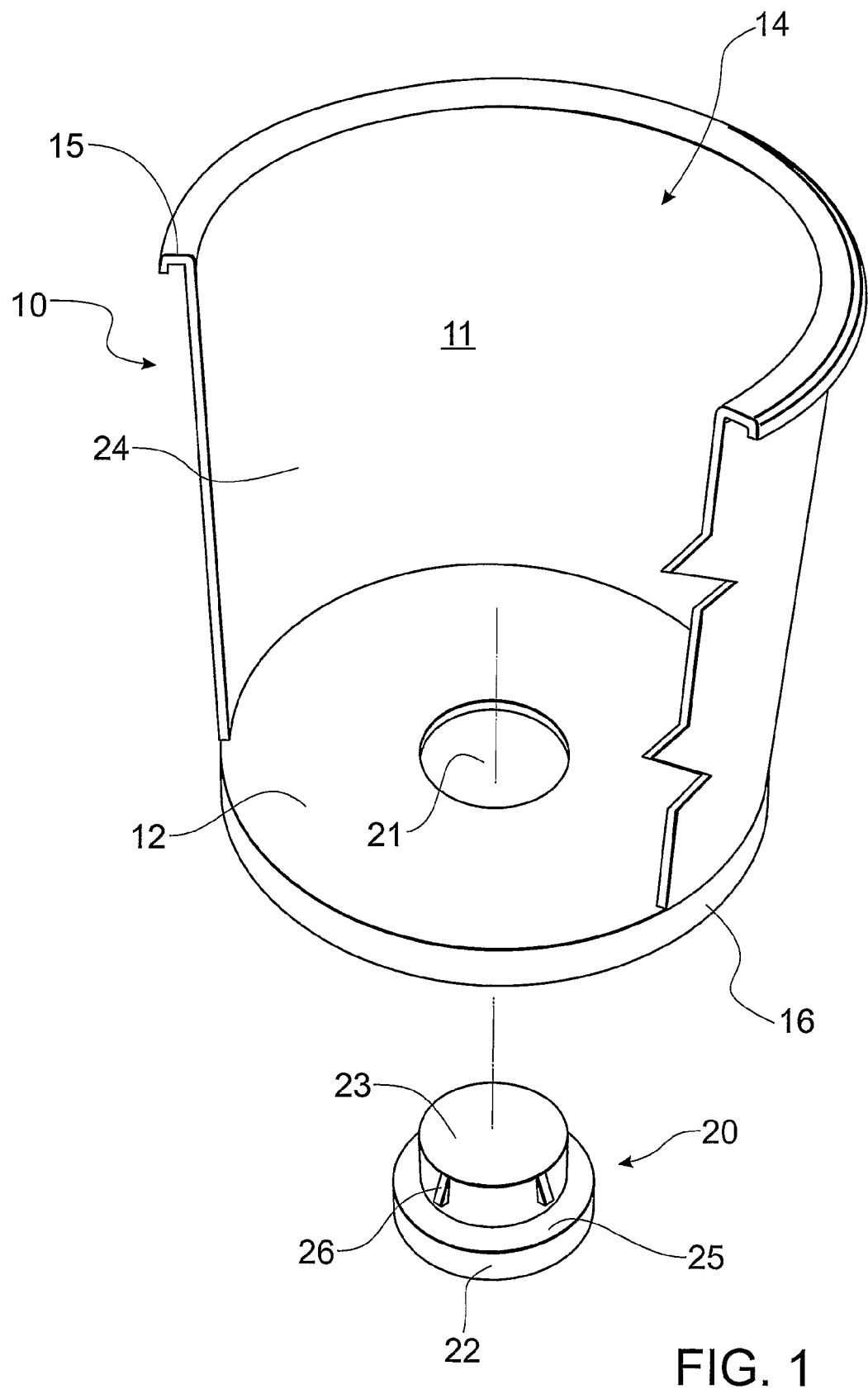
FIG. 1 is a sectional perspective view of a first embodiment of a pot of the present invention.

Referring to FIG. 1, there is seen a pot 10 formed by a continous side wall 11 and bottom wall 12. The pot 10 may be formed from any suitable material but it is envisaged the most cost-effective material for commercial use will be a plastic pot as is well known to the art. The pot may be formed with horizontal root escape slots (not shown in this embodiment) which are provided to allow roots to escape laterally from the pot. The roots may then be easily air pruned to retain vigour in the root system while avoiding a mechanical engagement with a capillary mat (to be described).

While the pot is shown as frustoconical in configuration, any suitable shapes such as cylindrical, boxlike or fluted may be used.

The side wall 11 forms an upper mouth 14 to allow loading of the pot 10 with suitable growth medium for plants and planting of seedlings. An upper edge 15 of the wall may be formed as a simple termination of the wall or as shown as a ledge, lip or similar. The bottom wall 12 has a peripheral ridge 16 which provides a foot for the pot, a reinforcing effect and some clearance under the bottom wall 12.

A liquid transfer means is in this case, formed by a plug 20 aligned with an aperture 21 in the base 12. The plug is formed with a butt section 22 protruding externally of the pot and an upper section 23 which extends inwardly and upwardly into the chamber formed by the side wall 11 and bottom wall 12. A shoulder 25 and wedges 26 are also formed on the plug. The upper section may flare outwardly and downwardly to provide adjustability to compensate for different sized apertures when using a simple friction fit. Additionally, the weight of the full pot will tend to urge the aperture onto the plug and maintain close apposition of the plug and aperture wall. The plug is formed of a porous material to allow for capillary action and transfer of liquid. The plug may be formed of any suitable material but a particularly effective and cheap composite is a concrete mix. The material may also comprise clay products, wood porous, plastic or diatomaceous earth. Porosity may be varied to suit different plants and conditions. Porosity in concrete may be varied according to the proportions of sand, cement and water. In this invention, different plants may be better suited to plugs of different porosity. Alternative materials include rubber, ceramic (fired and unfired), wood, wood products and synthetic polymers. It is important that the plug has fluid pathways that allow capillary action but are fine enough to resist root penetration A preferred upper limit is 50 microns but larger diameters may be suitable.

Presentation of liquid to the butt section 22 will result in capillary action drawing liquid through the plug 20 and into the chamber 24 and into a zone which is spaced from and above the bottom wall 12. The zone may extend to the bottom wall but terminates upwardly of the wall to provide a liquid inlet and/or outlet at a distance into the chamber. The plug also transfers water outwardly of the pot to a zone adjacent the bottom wall 12. This may be contiguous with the bottom wall or slightly spaced therefrom. This provides a stability and efficiency which allows for effective use with mat watering systems as described below. As is apparent in this embodiment the butt section 22 is dimensioned to extend downwardly to correspond with or extend slightly past the depth of peripheral ridge 16 to provide contact with an underlying watering structure.

Traditional teaching has held that roots are hydrotropic. Consequent belief is that the roots will migrate to an inlet source of water and ultimately either penetrate through an aperture and block it or compromise the transfer channel from an inlet water source. The inventor has found that while roots in medium with water supplied continuously from the bottom are strongly geotropic, they are not all attracted to an incoming water source. Thus, water input zones above the floor of the pot (e.g. at the top of plugs or conduits or on the surfaces of tapes) are unlikely to become choked with roots. Consequently, their efficacy as water conduits should continue irrespective of root massing at the base of the pot. The present invention provides a water transfer means which takes water from an external environment outside the pot and delivers it inwardly remote from the base to thereby avoid problems with the root mass. Of course, the arrangement also provides a mechanism for taking excess water from inside the pot and transferring it outside. In some embodiments, this may be the only function.

The plug 20 may be formed in any suitable shape. Although cylindrical is a convenient and easily formed shape, the plug may be rectangular, triangular in cross section, conical or other shapes. In one embodiment, the plug may be formed with a base. In one embodiment, the plug may be formed with a base having a conical or pyramidal upper section which terminates in a point. The pot, in this instance, may be formed of a material that is penetrable by the point. A series of the plugs may be arranged around a capillary mat, for example, and the pots may simply be impaled onto the end of the plug thereby providing suitable insertion. In this application, the pot may be formed of a flexible plastic material and may be a plastic or other similar material bag which is penetrable by the point of one or more plugs.

In the present plug, wedges 26 are formed to engage the bottom wall 12 and hold the plug in position. The wedges may extend to shoulder 25 and be adapted to cut into the edge of the aperture 21. However, in this embodiment, the wedges terminate above the shoulder 21 to allow the edge of the aperture to distort and then snap into position under the wedges with the space available corresponding to a width of the base wall 12 to give a tight nesting of the plug against the pot.

The plug may be formed with any suitable dimensions. The following are for a representative embodiment only. The butt diameter may be 38 mm with an upper section diameter of 34 mm. The butt section may be 5 mm high and the upper section may be 20 mm high. The plug however may extend considerably further into the chamber and may extend the full depth of the growth medium. The butt may be formed of greater or lesser dimensions. In one alternative embodiment, the plug may form the entire bottom of the pot to thereby replace the bottom wall. A single pot may have two or more plugs which may be of particular assistance in a seedling tray, for example.

Growth media are well known in the plant industry and may comprise one or a mixture of peat, coir, bark, vermiculite and sharp sand. Of course, there are other materials such as soil, compost, humus and other materials used and known which also fall within the scope of the term growth medium. When used in a conduit as a liquid transferring material, the growth medium may be any suitable material or mixture with sufficient capillary characteristics to effect the described function associated therewith.

The plug may be coated on its lateral surface with a material to ensure obliteration or minimisation of the gap between the plug and the aperture wall. Suitable materials may include plastics, gelatinous materials, waxes or similar.

The present embodiment displays a clip lock engagement. It should also be understood that the plug may include positive fixing means such as an adhesive. The plug may be formed with a collar dimensioned and configured to be urged into the aperture and form an intervening barrier between an edge of the aperture and the plug or wall. The plug may have a thread and be screwed into the hole in the base of the pot. A plastic cap with holes may be placed over the plug portion protruding from the bottom of the pot. The cap may assist in resisting plug abrasion. The cap may be of particular use where ports are primarily used for drainage and may be removed to promote capillary water uptake.

It is preferred for the plug to closely abut the wall of aperture 21 to prevent or resist root penetration. The preferred proximity of the components will vary for different plants. A preferred non-limiting range is 500 microns or less and maybe 300 microns or less. A particularly preferred range is 200 microns or less and 50 to 100 microns may be suitable in some circumstances. The desired end point is to provide a space that deters roots entry in a given circumstance.

While delivery of liquid to the growth medium has been outlined, it should also be understood that the plug may act as an outlet for liquid in an over-watered pot. Liquid may run from the medium through the plug and externally of the pot. This two-way ability provides great utility in systems where pots are exposed to rain or excessive overhead watering.

Figure 2:
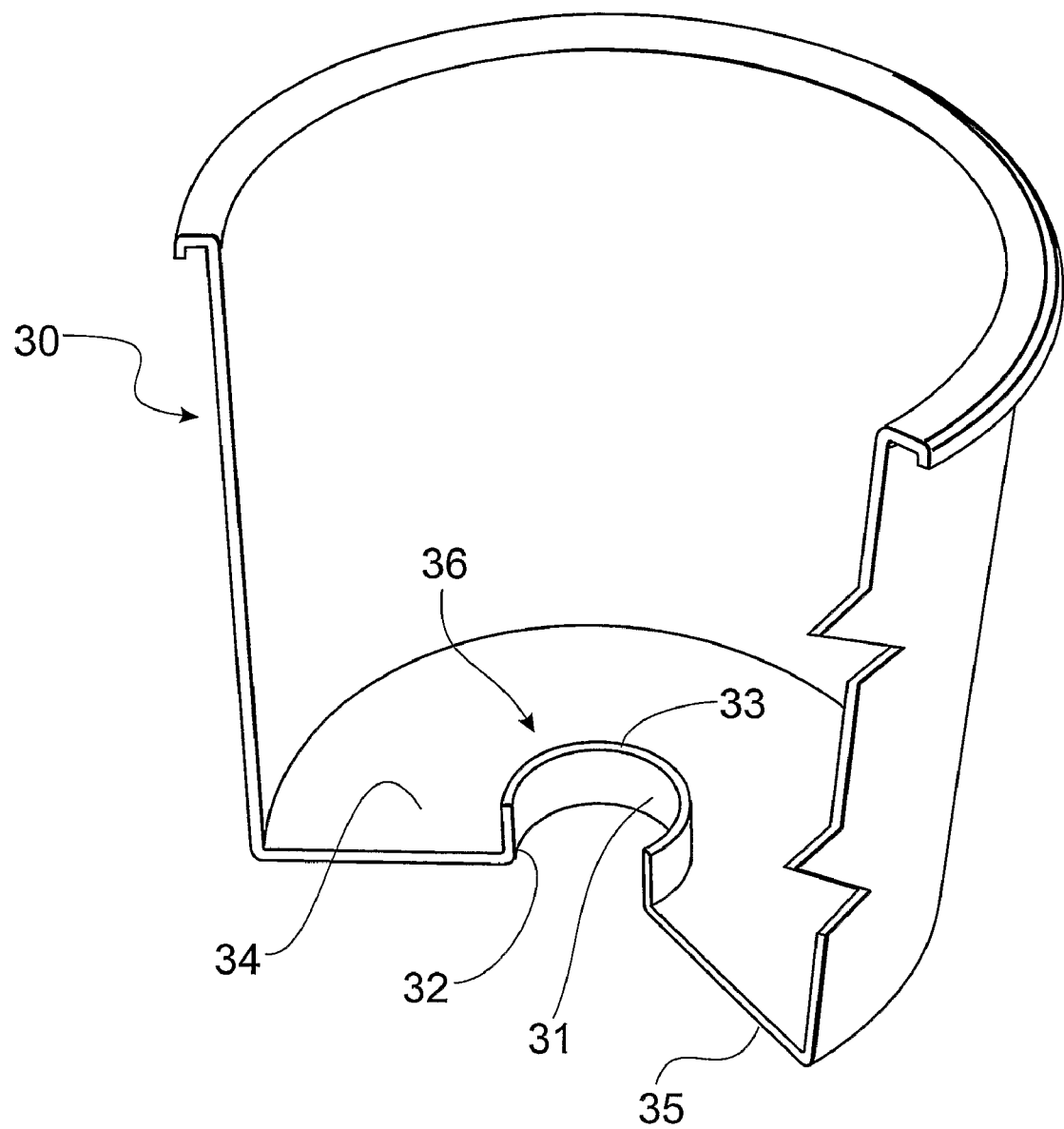
FIG. 2 is a sectional perspective view of an alternative embodiment of a pot of the present invention.

Referring to FIG. 2, a pot 30 is seen having a liquid transfer conduit in the form of a tunnel or well 36 formed by wall 31 connecting an internal aperture 32 and an external aperture 33. The wall 31 is dimensioned to receive a liquid transferring material such as a porous plug, a fibrous liquid-porous material, coir or growth medium. A particularly useful plug may be formed from polyester. In one simple use, the pot 30 may be positioned on a water supply device such as a bowl and filled with growth medium which also sits against the wall 31 and provides one example of liquid transfer means. The nature of growth medium is to be water permeable thereby providing an outlet pathway as well as an inlet capillary action pathway. Of course, water may also be supplied by external flooding to a level above the height of internal aperture 33.

The inventor has surprisingly found that roots are strongly geotropic in conditions of adequate water. The roots therefore grow into the space 34 and show little tendency to grow back up and into the well 36 formed by apertures 32, 33 and wall 31.

Another feature of this pot is a flat bottom wall 35. Prior art pots are usually concave. The provision of a flat bottom allows easy cleaning by simply passing a scraper, such as a simple paint scraper, over the surface to remove any attached material including any roots which may have managed to penetrate the well 36.

Figure 3:
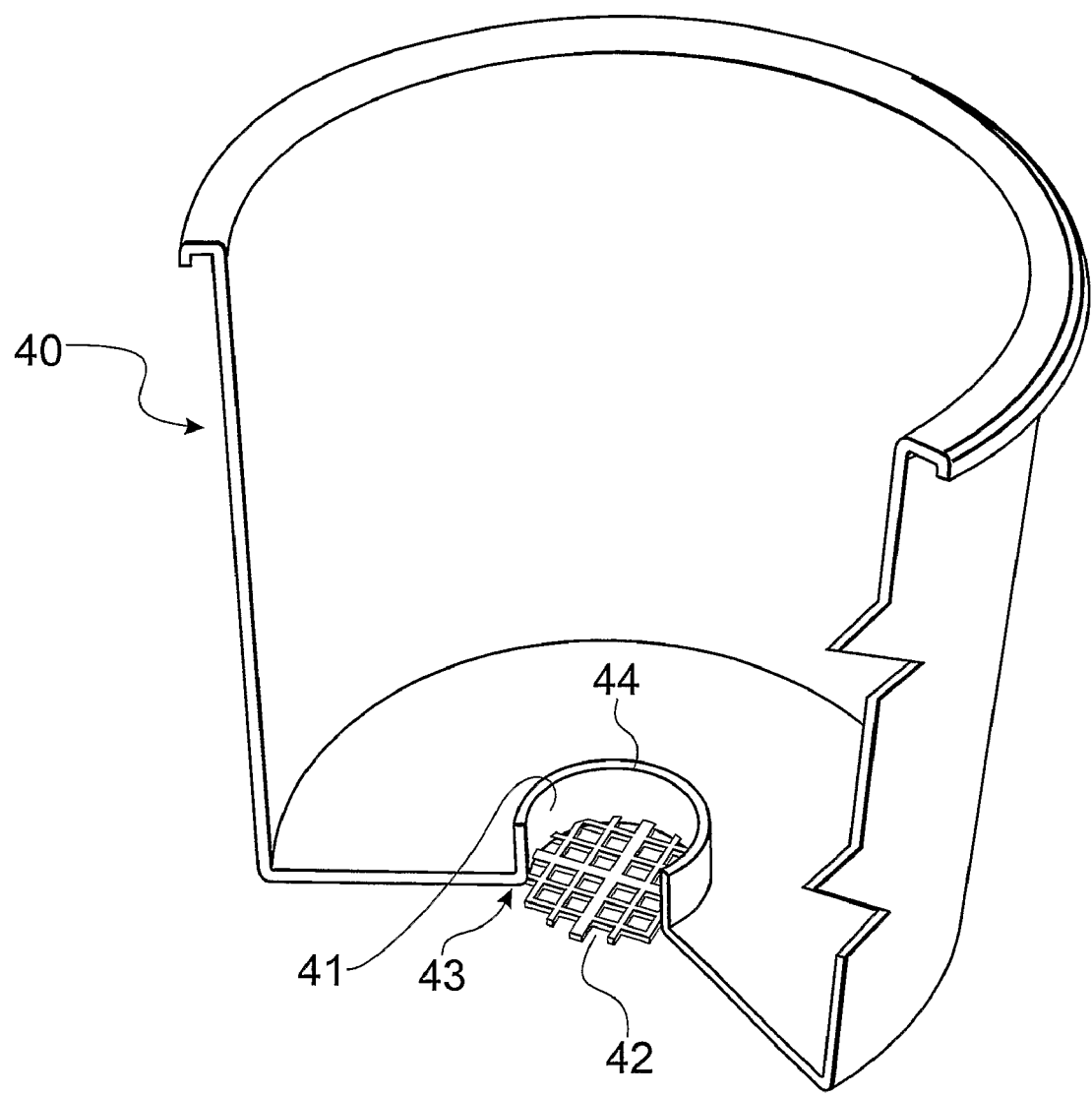
FIG. 3 is a sectional perspective view of a third embodiment of a pot of the present invention.

Referring to FIG. 3, there is seen a pot 40 similar to the embodiment of FIG. 2 but incorporating one example of retention means for retaining liquid transferring material in the well or tunnel. In this case, a grid 42 is provided to hold, for example, growth medium. The grid 42 may be formed integrally with the pot or alternatively may be removably engaged with the wall through a collar (not shown) extending into the well or conduit 41. In fact the well itself may be formed as an insertible modular device for retrofitting to existing pots with base wall apertures. The present embodiment is particularly suitable for efficient loading and use. A growth medium may be simply loaded into the pot under gravity, thereby filling the conduit or well 41. The growth medium then serves as a liquid transferring material to move liquid between the internal aperture 44 and external aperture 43. The pots may be automatically filled in line for large commercial use while still retaining the functionality of the present invention. Other suitable material may be positioned in the well 41. For example, capillary mat material may be placed inside the well to provide suitable function. One further alternative is the use of a polyester pad positioned on the grid 42 with growth medium positioned over the pad which may extend around ½ to 2 cms upwardly. A skilled addressee will be aware of many alternative suitable materials. Other configurations may be used to provide the retaining effect of the grid. For example, parallel bars may extend across the outlet or external aperture 43 to provide a screen.

Figure 4:
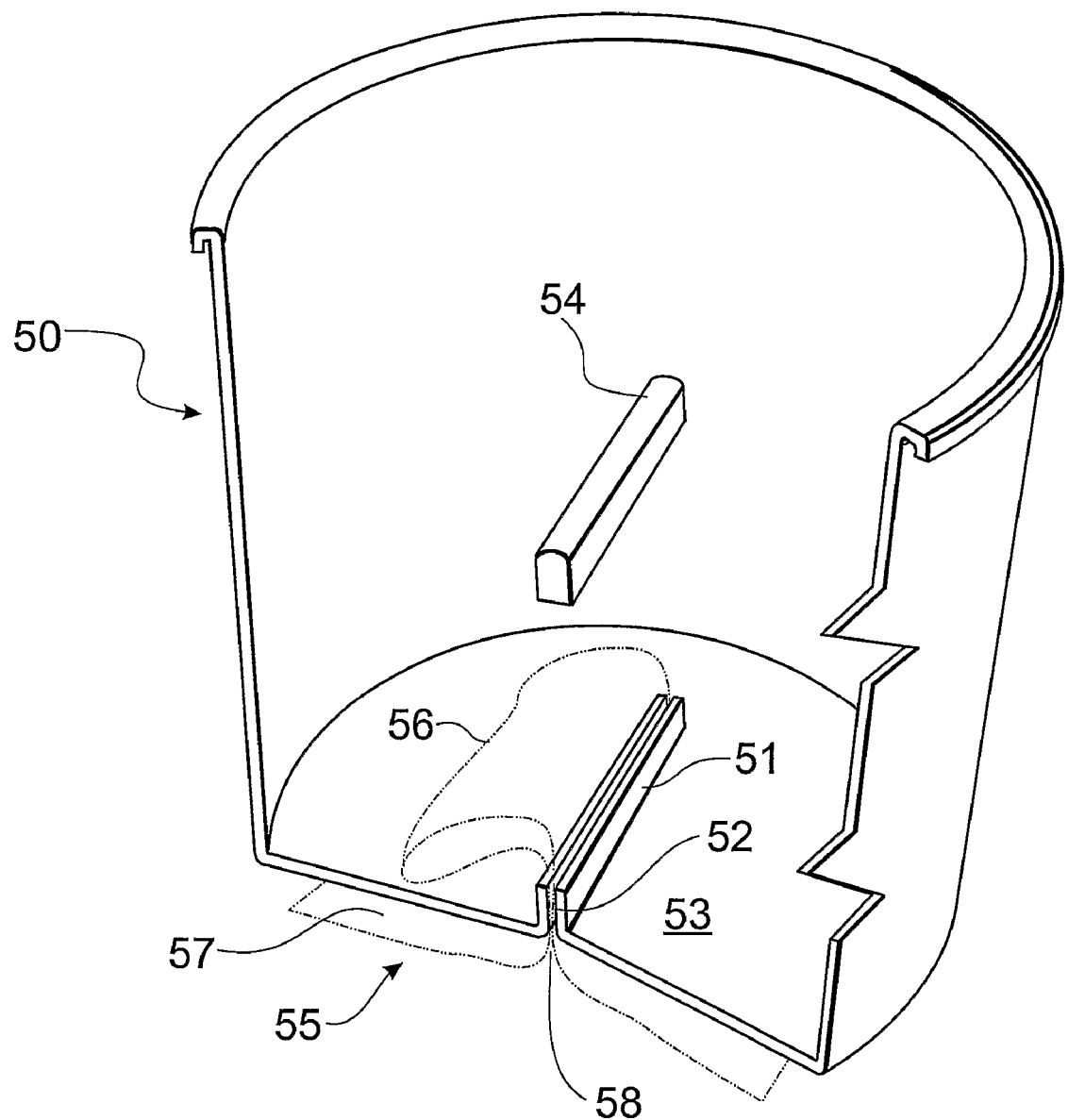
FIG. 4 is a series of views of a fourth embodiment of a pot of the present invention.

A pot 50 is shown in FIG. 4 with a further embodiment of a liquid transfer conduit formed as a slotted ridge. The ridge 51 has a central slot 52 which penetrates the base 53 of the pot 50. A cap 54 (shown here as aligned for application) is located or formed on the ridge 51 and defines a 180° turn in the direction of a channel formed by the slot and cap.

A water permeable material 55 is positioned in the slot and extends into the slot 51 and with an internal section 56. An external section 57 is located under the pot 50 with an intermediate section 58 providing a water passage through the slot. The material 55 may be any suitable composition and may for example be calico, or a fibrous wick or any of a range of suitable substitutes.

In FIG. 4A the external section 57 runs into the intermediate section 58 positioned in the slot 52. Water may be transferred inwardly or outwardly as appropriate. The tortuous path described by the water permeable material restricts opportunities for roots to exit the pot or occlude the water pathway. The cap 54 is in position and the permeable material 55 terminates adjacent the base or bottom wall 53 providing transfer from a zone 59 spaced from the base 53 as well as adjacent the base.

FIG. 4B shows the components of the slot, cap and material aligned for assembly. The slot may be any suitable dimensions. One range of dimensions, by way of example only is a slot width of 1 mm to 5 mm, a horizontal length of 10 mm to 40 mm and extending inwardly. While any suitable extension is acceptable, a preferred range is 8-20 mm which provides pots with good stackability for transport and storage.

FIG. 4C shows a variation in which the internal section 156 is seen in top view extending outwardly of the slot and ridge 51 into the growth medium chamber.

FIG. 4D is a side sectional part view of a further embodiment in which the cap 154 is formed integrally with the ridge 151. While a plastic hinge 159 is shown, the cap 154 may be formed of a thin plastic material sufficiently resilient to deform and spring back in operation. As is apparent in this view, the material 155 follows a tortuous or serpentine path, thereby further minimising the chance of root exit and obstruction.

The slot may be formed without a cap at all.

Further, the inventor has surprisingly found that the presence of the cap may allow the slot to be used without a material wick, at least for the purpose of water removal from the pot or for inlet of water, if an external flood level is above the slot level.

It should be noted that the present invention is primarily directed to control of water. However, combinations such as water and fertilisers or even treatment chemicals may also be applied and fall generally in the term "liquid". The two terms "water" and "liquid" may therefor be interchangeable unless the context dictates otherwise.

Figure 5:
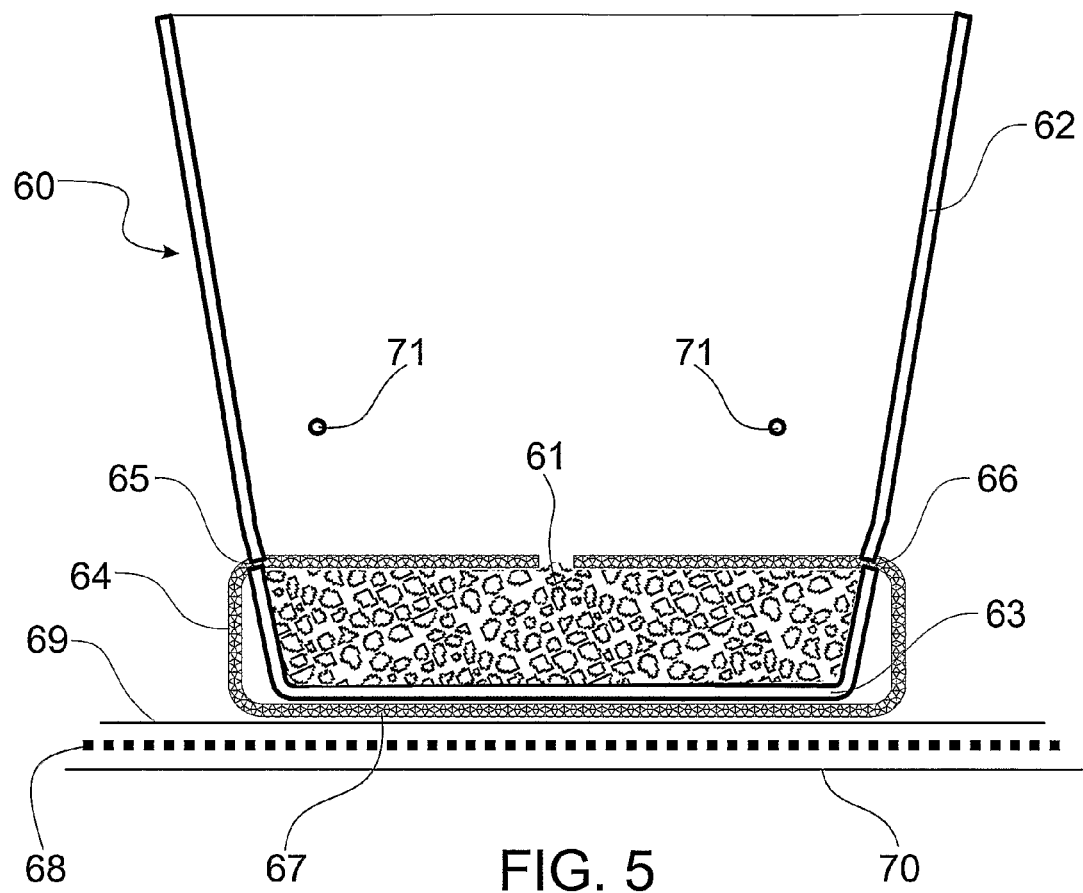
FIG. 5 is a side sectional view of a fifth embodiment of a pot of the present invention on a capillary watering mat.

FIG. 5 shows a further alternative embodiment of a pot using fibrous members in the form of wicks.

The pot 60 contains growth medium 61 within sidewall 62 and bottom or base wall 63. A fibrous wick or tape 64 is routed from below the bottom 63 and through two spaced apertures 65, 66 in the wall 62. The tape 64 extends inwardly, substantially horizontal, to terminate within the body of the medium 61. The present view shows the tapes sitting on a base of growth medium and requiring addition of further medium to fill the pot. Of course, the tape may be directed upward or downward if preferred. Additionally, a single tape may enter the pot through only one aperture.

A lower section 67 of the tape 67 is sandwiched between the pot 60 and a capillary mat 68 which is partially covered by a weed mat 69 and supported by an impervious plastic liner 70. The apertures 65, 66 are located approximately 1 cm above the bottom 63 but may be positioned at other heights. The tape may insert through an aperture in the bottom. It is preferred that the tape substantially occupies the whole of the aperture.

Figures 6, 7:
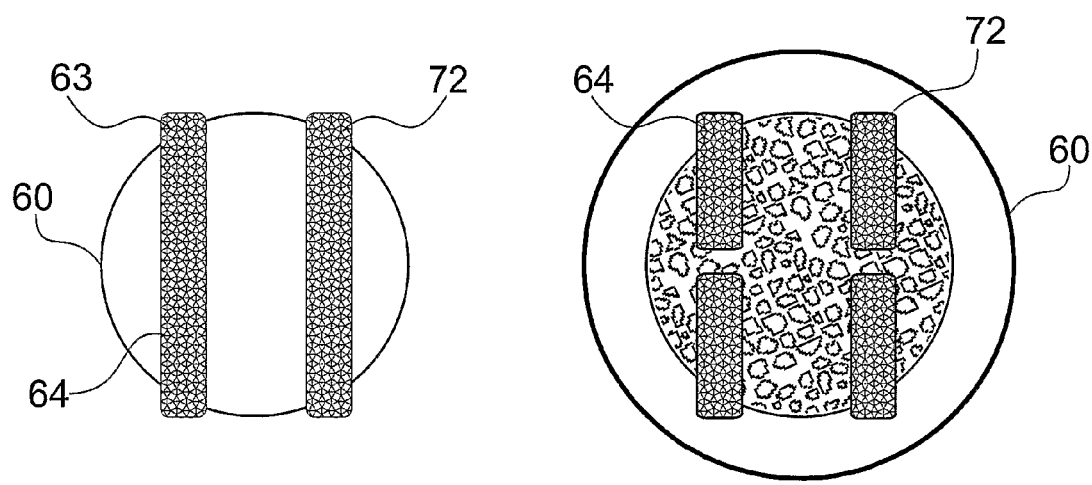
FIG. 6 is a bottom view of the arrangement of FIG. 5.
FIG. 7 is a top view of the arrangement of FIG. 5.

FIG. 6 shows a bottom view of the arrangement of FIG. 5 which highlights the presence of two parallel tapes 64, 72. The tapes may be angularly deviated and may in fact cross.

FIG. 7 shows a top view with the tapes 64, 72 in place inside the pot 60 and ready for addition of extra medium. Apertures in the form of weep holes 71 are formed in the wall 62 at any suitable height are also shown in FIG. 5. The weep holes 71 may provide an indication of sufficient watering, particularly in overhead watering systems, by discharging water onto an outside surface of the pot 60. The weep holes may be distributed circumferentially and may be at different heights.

Figure 8:
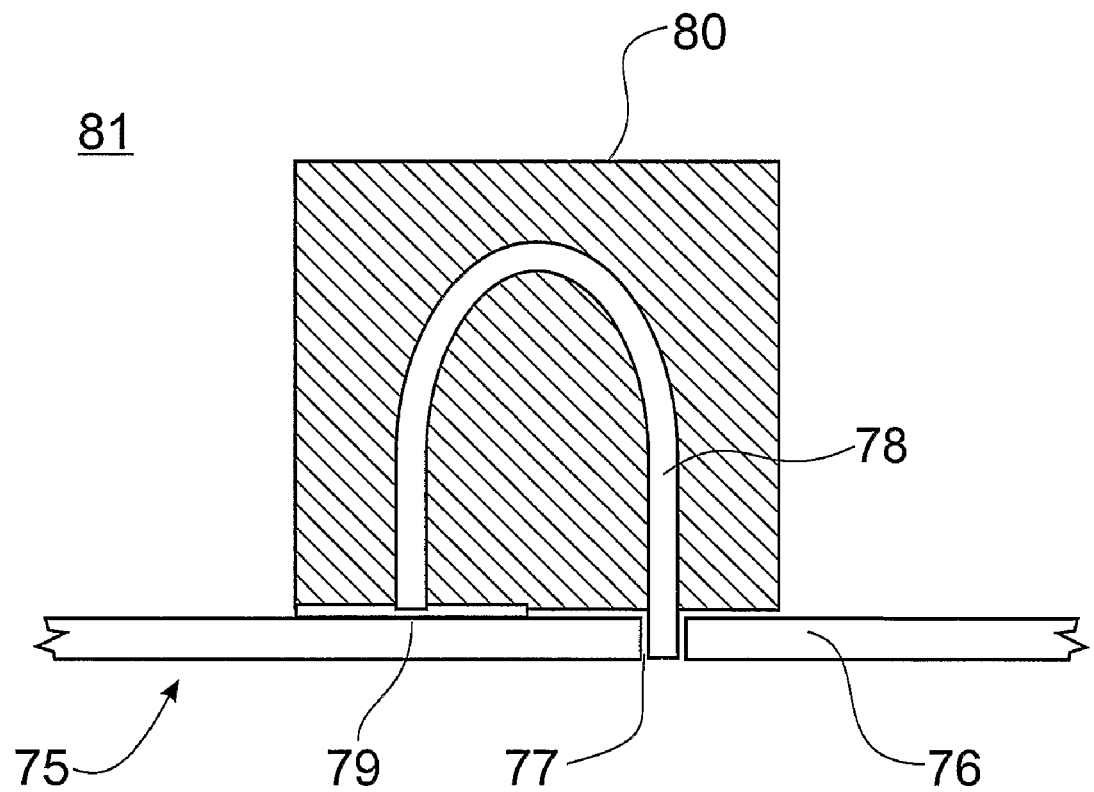
FIG. 8 is a sectional part view of a sixth embodiment of a pot of the present invention.

A further embodiment of a liquid transfer arrangement is shown in the part-sectional side view of a pot 75 in FIG. 8. The base or bottom wall 76 is penetrated by an aperture 77 which is continuous with a siphon tube 78 which, in this example, is an inverted U-shape. The siphon tube 78 terminates in an internal end 79 positioned adjacent and spaced from the base 76. This spacing ensures a zone of liquid retention adjacent the base in the pot chamber.

In the present embodiment, the siphon tube 78 is formed or embedded in a support block 80 which supports the tube as well as enhancing function. It should be understood, however, that the tube may be simply formed and may be self-supporting or supported by the growth medium. Additionally, shapes other than U-shaped may be suitable provided they function as described below. The internal end 79 may be spaced from the base further then shown to provide a clear zone above the base.

This embodiment minimises root escape while allowing drainage through a hole in the base of the pot to which the tube is attached. The tube 78 has a 3 mm internal diameter and rises vertically from the hole for a distance of 1 cm to 2 cm before turning back on itself through 180° with its open end very close to the inside bottom of the pot. Water will not drain through this tube until the free water table in the pot rises to a level above the height of the tube. As the water in the tube also rises, a height is reached when syphoning in the tube occurs with the consequent flow of water through the tube out of the pot. Consequently, the water table in the pot drops to a position level with the basal opening of the siphon tube. External flooding may urge water into the pot through the tube.

The open end of the siphon tube may be cut at an angle to ensure that it does not sit flush with the bottom of the pot and so become occluded.

The exit drainage hole 77 may be in the base of the pot, as shown, or at the bottom of the side wall of the pot.

Because of the vertical disposition of the inverted siphon U tube combined with the normal positive geotropism of roots, few if any roots will enter the tube and travel vertically upwards and then downwards and so escape.

To prevent or minimise root entanglement with the siphon U tube, the tube may be embedded in a block of impervious plastic 80, as shown.

The siphon(s) may be moulded in the pot or affixed to the base after pot manufacture, with one or more being used in each pot.

In addition to the benefit of preventing root escape, this embodiment allows the accumulation of a shallow water table before drainage occurs thereby removing water from zone 81 in the chamber spaced from the base 76. This counteracts the rapid removal of water that occurs through prior art drainage holes before the medium has had time to soak up added water.

FIG. 9 shows a series of schematic side views of arrangements for use in a well pot configuration similar to FIG. 2 or 3.

FIG. 9A is a side view of a cylindrical well or conduit 82 having a retention screen or mesh 83 positioned in an outlet aperture 84. The side walls 85 of the conduit or well are continuous and impervious and terminate in internal aperture 86.

FIG. 9B shows the arrangement of FIG. 9A including a plug 87 positioned in the conduit 82. The plug may comprise a porous material as previously described and may terminate slightly below the internal aperture 86. The plug may include a biocidal agent such as Copper Hydroxide to ensure any roots that enter the conduit or wall 82 do not proceed further. Such an agent may be impregnated into any of the water transfer arrangements described and that are suitable to retain the compound. However, it is generally anticipated that the plug will fit against the side walls 85 sufficiently tightly to resist or prevent root penetration.

FIG. 9C shows the embodiment of FIG. 9A with a cap 88 positioned over the side walls 85 and overlapping on both sides of the wall. A space 89 is provided between the cap 88 and walls 85 to allow water passage. The cap and side walls define a tortuous path to better resist root passage.

In FIG. 9D a wick 90 is provided to assist in the transfer of water under the cap 88. In this case the mesh is absent.

FIG. 9E shows a porous plug which extends laterally beyond the walls 85 and has an annular recess 92 dimensioned to receive the walls 85 and again define a tortuous path while also allowing liquid transfer through the body of the plug.

FIG. 9F shows the embodiment of FIG. 9E further including a cap 93 positioned over the plug. The cap may deter root growth onto the top of the plug.

Figure 10:
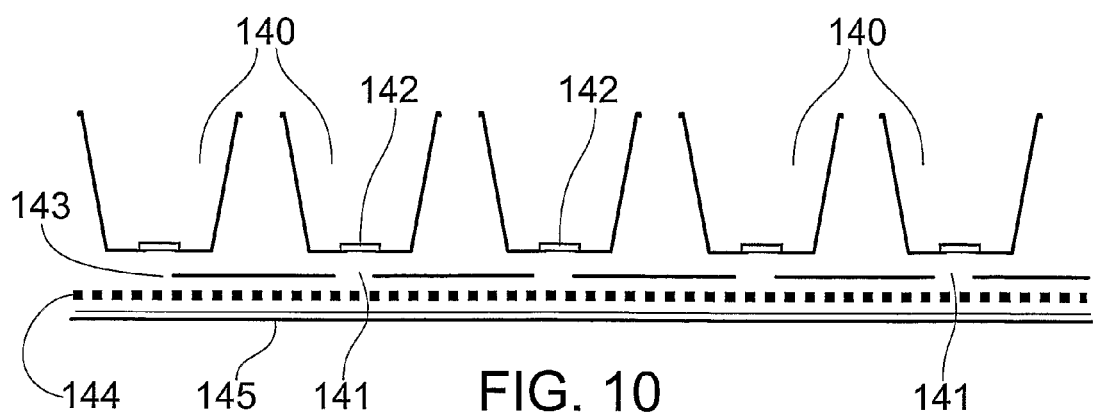
FIG. 10 is a side schematic view of a first system for water management of a series of pots.

FIG. 10 shows a series of pots 140, each arranged in position with a corresponding aperture 141 aligned to receive liquid transfer means which may be plugs, conduits with suitable function or tapes or wicks. Here they are exemplified by wells or conduits 142 containing growth medium. The apertures 141 are formed in an upper barrier 143 above a capillary mat 144 and lower barrier 145. The upper layer is continuous with the apertures formed to receive the pots. The weight of the pots may cause a slight depression so that flow of surface water will be into the apertures 141 and ultimately into the mat 144 and pots 140.

Figure 11:
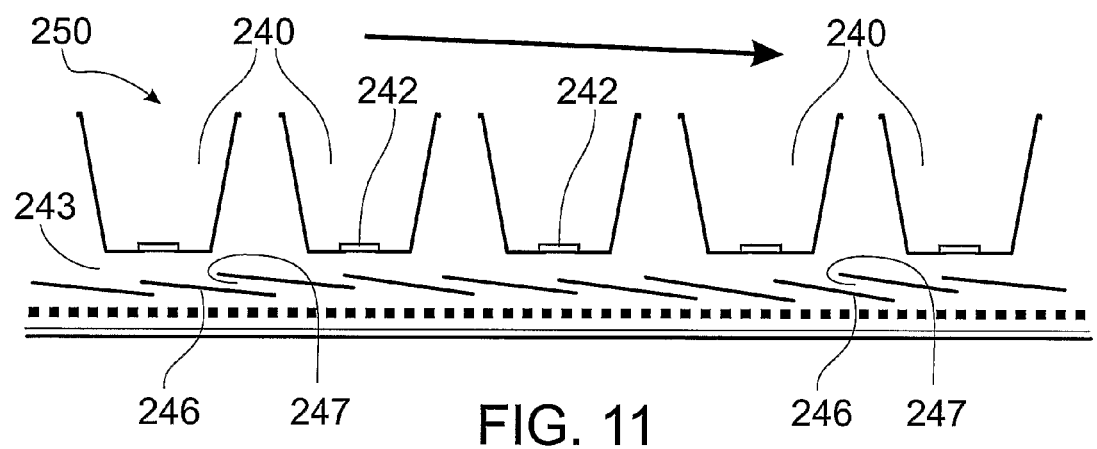
FIG. 11 is a side schematic view of a second system for water management of a series of pots.

FIG. 11 shows a down slope view of an arrangement 250 in which it is apparent that the upper barrier 243 is formed by a plurality of overlapping sheets 246 of material thereby providing water inlet pathways 247 to allow surface water to flow between the layers 246 and into the capillary mat. The overlapping barriers may be formed from strips of reflective plastic film. Irrigation water or rainfall will trickle between the overlapping sheets and be stored in the capillary mat for later uptake by plants. The overlapping sheets minimise evaporation and the reflective film will normally be dry preventing the growth of algae or weed seed. Any roots emerging from side slots in the pots, if present, may be air pruned.

Figure 12:
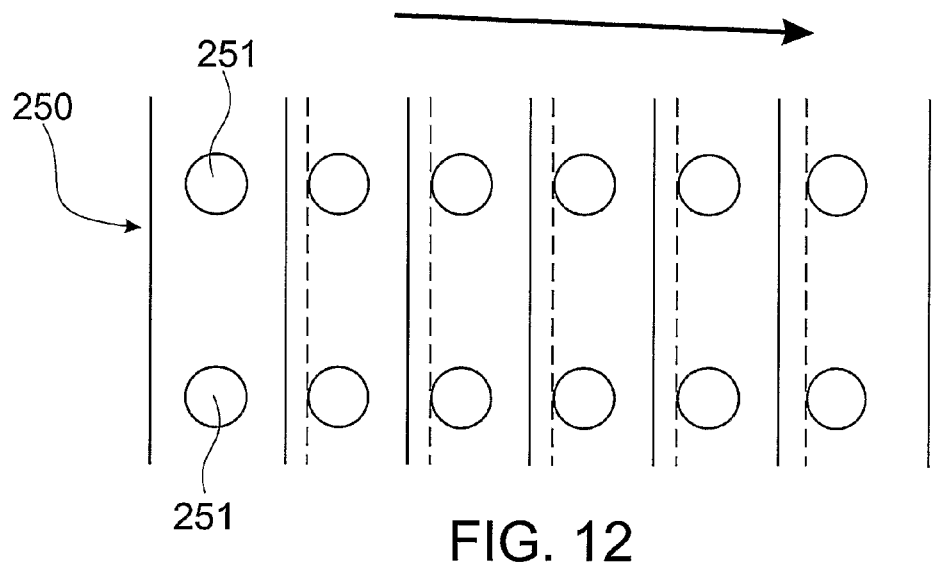
FIG. 12 is a top view of the arrangement of FIG. 11.

FIG. 12 shows a plan view of the barrier and capillary mat arrangement 250 of FIG. 11 with apertures 251 formed for receiving plugs from the pots.

Although the overlapping sheets show a preferred embodiment, it is also envisaged that a straight capillary mat may be provided as the upper surface or the upper surface may be a substantially impermeable barrier with holes formed to receive pots. The weight of the pots may create a depression of this barrier leading to collection of top delivered water around the pots and subsequent entry into the capillary mat. This system allows use of either or both overhead water delivery and capillary mat irrigation. Presence of the root central device avoids damage to the plants and the capillary mat when the pots are removed. This damage arises in prior art systems when roots grow into the matting leading to its degradation.

EXAMPLE 1

A trial was conducted growing maize in prior art pots with a simple central hole, and with 5-24 drainage holes. Simultaneously, maize was grown in novel pots with tape wicks ("tapes"), novel pots with wells (with and without caps) and novel pots with plugs of different sizes (respectively "tape pots", "well pots" and "plug pots"). The results are shown in Table 1 wherein the fresh weight (g/plant) of emerged roots was shown to be greatly reduced or zero in pots of the present invention. Further, the weight of above soil plant was very similar indicating no detriment from use of the present embodiments.

TABLE 1

Effects of 4 pot water entry modes (tapes, holes, plugs and cental wells) on quantity of root escape after 34 days growth in maize, cv. Pac 424.

| Treatments | Fresh weight (g/plant) of emerged roots | | | | Shoot fresh weight |
|---|---|---|---|---|---|
| | Rep 1 | Rep 2 | Rep 3 | Mean | (g/plants) |
| Tapes | 0 | 0 | 0 | 0 | 85.8 |
| Pot with 5 Holes | 2.25 | 2.29 | 1.07 | 1.87 | 87.4 |
| Pot with 24 Holes | 1.37 | 0.94 | 0.59 | 0.97 | 79.0 |
| Pot with 8 Holes | 2.03 | 1.22 | 0.49 | 1.25 | 82.1 |
| Central Hole (CH) | 0.19 | 0..22 | 0.11 | 0.17 | 72.0 |
| CH + 2 cm well | 0 | 0 | 0 | 0 | 73.8 |
| CH + 3 cm well | 0.01 | 0 | 0.01 | <0.01 | 80.3 |
| CH + cap | 0.01 | 0.02 | 0.03 | 0.02 | 71.7 |
| CH + 2 cm well + cap | 0 | 0 | 0 | 0 | 83.9 |
| CH + 3 cm well + cap | 0 | 0 | 0 | 0 | 73.4 |
| 1 cm plug (38 mm) | 0 | 0 | 0 | 0 | 80.2 |
| 2 cm plug (38 mm) | 0 | 0 | 0 | 0 | 88.8 |
| 3 cm plug (38 mm) | 0 | 0 | 0 | 0 | 81.3 |
| 2 cm plug (62 mm) | 0 | 0 | 0 | 0 | 91.8 |
| LSD (P = 0.05) | | | | 0.45 | NS(8.2) |
| Coef Var (%) | | | | 94 | 12.4 |

NS = no significant difference at 0.05.

EXAMPLE 2

Five different species were grown in plug pots, well pots and prior art pots over three weeks. The results in Table 2 show the plug and well pots as superior to the prior art arrangement.

TABLE 2

Effect of pot type on root escape in five bedding plant species. Fresh weight of roots escaping from base of three PWEM pot types in five bedding plant species sub and overhead irrigated, 3 weeks after transplanting.

| Bedding plant species | Root fresh weight (g/pot) Pot water entry mode (PWEM) | | |
|---|---|---|---|
| | Plug | Well | Holes |
| Lisianthus | 0 | 0.02 | 0.07 |
| Petunia | 0 | 0.01 | 0.01 |
| Impatiens | 0 | 0.34 | 2.06 |
| Marigold | 0 | 0.26 | 4.25 |
| Vinca | 0 | 0.01 | 0.01 |
| Mean | 0 | 0.13 | 1.28 |

EXAMPLE 3

Marigolds were grown in plug pots, well pots and prior art pots. Table 3 shows the root escape was minimal in the pots of the present invention when compared to the prior art pots. Additionally the plant growth was unaffected by use of the pots.

TABLE 3

Fresh weight of roots escaping from base of three PWEM pot types in two bedding plant species, sub and overhead irrigated, 6 weeks after transplanting and followed escaped root removal after 3 weeks.

| Species | Plant part | Plug | Well | Hole |
|---|---|---|---|---|
| Marigold | Shoot | 53.5 | 52.9 | 62.2 |
|  | Root | 0.04 | 0.35 | 3.42 |

The plugs described may be formed as removable plugs. They may be designed for retrofitting into existing pots. Alternatively, pots with pre-existing apertures may be provided and plugs for subsequent insertion by a grower in the conditions where the present system is desired.

The inventor's discovery that roots are not attracted to an incoming source of water, at adequate moisture levels, is significant. The present invention overcomes the negative effect of blockage of drainage holes with roots and the resultant detriment to water uptake. Using a plug or conduit which is relatively small compared to the bottom area of a pot provides the ability to replace the current permeable weed mat with an impervious overlying film with small access holes to the wet underlying geofabric. Such an impervious dry material will prevent most surface evaporation, algal development, weed growth and insect development without the use of any chemicals, currently the mainstay of prevention. Depressions in geofabric resulting from the weight of a pot being concentrated through the plug may provide low points for the entry of water that falls from rain or irrigation on the impervious film and into the underlying geofabric. This may result in greatly enhanced water saving while retaining the option of a hybrid watering system with water being applied from below or from above but with minimum wastage.

Some embodiments of the present invention may also have the added advantage of concentrating weight in plugs to provide better contact with the geofabric. Water is used more efficiently with resultant reduction of wastage and also reduced nutrient loss in leachate.

The system of water management may provide faster growth and a subsequent shorter growing period while using less quantity of medium to get the same results. The pots may be reusable. Earthworms are unable to enter pots and find difficulty in accessing the channelled pots, depending on the gauge of any mesh present. They will also be excluded from pots with wicks or tapes. Similar advantages arise in other embodiments.

In general, if the upper point or surface of a water inlet conduit is above the zone of basal root concentration, its function in providing capillary flow to the medium will not be impeded to the same extent as holes formed in the bottom of the pot which are quickly covered with roots.

Plugs or conduits may be used in bottom up watering systems to facilitate water uptake and to prevent root escape; in overhead watering and rain systems to reduce the rate that water flows out of the pot and to prevent roots penetrating the underlying media. They may be used in both bottom up and overhead watering, being effective in reducing root clogging, root lift and too rapid drainage. The liquid transfer means are not restricted in height or diameter. Plugs may extend to the height of the medium and will usually have permeable sides providing water throughout its length. The plug may be formed as a moisture absorbing plastic formed integrally with the pot. The conduit formed as a well may be adapted to receive a plug. The mesh in this embodiment may be removable or, alternatively, penetrable (i.e. plug may be forced through the mesh) to allow a choice of arrangements. A number of wells may be formed and may include a shoulder to receive and stop the plug.

The invention also extends to a method of providing water to a pot using a permeable plug, a wick or a well as described.

Advantages of the described embodiments include more predictable water uptake resulting from less interference arising from the root mass. They may also provide an ability for basal roots to be air pruned when basal side wall apertures are present. The present arrangement provides less chance for roots to enter into a capillary mat resulting in entanglement and damage to the integrity and function of the mat and also damage to the potted plant when torn from the mat. The arrangements shown may minimise algal growth on mat surfaces which may be of particular problem in high humidity and heat environments. This avoids a need to use chemicals to prevent algae or root growth wherein the chemicals may be potential environmental pollutants. Further and importantly, pot drainage will be less affected by root blockages and indeed may be unaffected in this regard.

Throughout the specification, the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the disclosure.

The invention claimed is:

1. A pot for growing a plant or plants, the pot comprising:
a side wall having an upper edge forming a mouth;
a bottom wall continuous with the side wall, the bottom wall and side wall together defining a chamber for containing a growth medium; and
one or more liquid transfer conduits, each liquid conduit extending upwardly from a base aperture in the bottom wall to an internal aperture positioned in an internal zone, each conduit open at each end and each liquid transfer conduit formed with a water impervious side wall;
wherein each liquid transfer conduit is adapted to receive liquid transferring material to transfer liquid to and/or from the internal zone in the chamber, the internal zone spaced from the bottom wall, and a local environment external to the pot and adjacent the base wall and the pot is adapted to resist root escape.

2. The pot of claim 1 wherein each liquid transfer conduit is cylindrical with a diameter in the range of 5 mm to 50 mm.

3. The pot of claim 1 wherein each conduit extends inwardly in the range of 2 mm to 80 mm.

4. The pot of claim 1 further including retention means for retaining liquid transferring material in the liquid transfer conduit.

5. The pot of claim 4 wherein the liquid transferring material is one or more of a growth medium, coir dust, bark, polyester, and soil.

6. The pot of claim 1 wherein the conduit is dimensioned to receive the liquid transferring material under the influence of gravity.

7. The pot of claim 4 wherein the retention means is a mesh positioned in the base aperture.

8. The pot of claim 1 further comprising an internal cap adapted to cover the internal aperture, sufficiently loosely to allow liquid to pass between the cap and an edge of the aperture.

9. The pot of claim 1 wherein the bottom wall is substantially planar on its bottom surface.

10. The pot of claim 1 further comprising a biocidal agent added to a liquid transfer conduit.

11. The pot of claim 1 wherein each liquid transfer conduit is formed as an inwardly extending slot.

* * * * *